US008694890B2

(12) United States Patent
Error (10) Patent No.: US 8,694,890 B2
(45) Date of Patent: Apr. 8, 2014

(54) USE OF COLOR IN A SITE ANALYSIS REPORT

(75) Inventor: Christopher Reid Error, Orem, UT (US)

(73) Assignee: Adobe Sytems Incorporated, San Jose, CA (US)

(*) Notice: Subject to any disclaimer, the term of this patent is extended or adjusted under 35 U.S.C. 154(b) by 1896 days.

(21) Appl. No.: 11/701,289

(22) Filed: Jan. 31, 2007

(65) Prior Publication Data

US 2008/0181463 A1 Jul. 31, 2008

(51) Int. Cl.
*G06F 15/177* (2006.01)

(52) U.S. Cl.
USPC ............ 715/734; 715/732; 715/737; 709/224

(58) Field of Classification Search
USPC ........... 715/734, 255, 737, 732; 709/224, 227
See application file for complete search history.

(56) References Cited

U.S. PATENT DOCUMENTS 5,870,559 A * 2/1999 Leshem et al. ................ 709/224
6,819,793 B1 11/2004 Reshetov

| | | | |
|---|---|---|---|
| 2002/0067360 A1 | 6/2002 | Chi et al. | |
| 2002/0133392 A1 | 9/2002 | Angel | |
| 2003/0115333 A1* | 6/2003 | Cohen et al. ................ | 709/227 |
| 2004/0064351 A1 | 4/2004 | Mikurak | |
| 2004/0174397 A1* | 9/2004 | Cereghini et al. ............ | 345/855 |

OTHER PUBLICATIONS

Chen et al., "Visualizing and Discovering Web Navigational Patterns". In: Proceedings of the 7th International Workshop on the Web and Databases: colocated with ACM SIGMOD/PODS 2004 [online]. Published Jun. 17, 2004, vol. 67, p. 13-18. [retrieved on Jul. 16, 2008]. Retrieved from the Internet: <URL: http://web.cs.ualberta.ca/~papersdb/uploaded_files/720/paper_we%20nav%20patterns.pdf>.

* cited by examiner

*Primary Examiner* — Sherrod Keaton
(74) *Attorney, Agent, or Firm* — Kilpatrick Townsend & Stockton LLP (57) ABSTRACT

In the context of a site analysis report showing paths between nodes, color is used to indicate a direction of traffic that follows a particular node-to-node path. Different colors are assigned to different nodes in a site analysis report. Paths are color-coded according to their destination nodes, so as to provide a distinctive visual identification of a traffic flow direction. Node connection direction can be reinforced by static or moving arrows.

21 Claims, 13 Drawing Sheets
(10 of 13 Drawing Sheet(s) Filed in Color)

USE OF COLOR IN A SITE ANALYSIS REPORT

FIELD OF THE INVENTION

The present invention is related to display of website visitation statistics, and more particularly to the use of color to indicate traffic flow direction in a site analysis report for displaying visitation patterns.

DESCRIPTION OF THE BACKGROUND ART

It is useful for website operators to be able to discern patterns of visitation to their websites. Website operators, advertisers, and other parties are interested in finding out which web pages within their websites tend to be visited more or less frequently than others. Such information has many uses, including for example: identifying problem areas in a website, identifying pages that tend to lose visitors to other websites, analyzing traffic flow for advertising and server load purposes, and the like.

Of particular use are statistics as to the visitation path flow that visitors tend to follow. Such statistics include for example, information as to where the visitors tend to enter the site, what pages do they tend to visit first, what pages tend to be visited just after or before other pages, and the like.

Website operators often ask the following questions about visitation patterns:

How do site visitation patterns look like from a big picture perspective, including high-level relationships among nodes?

What are the patterns of behavior for various segments of visitors?

Where are the significant pathing trends, including amount and direction of traffic flow?

What are the exit points in context with site flow?

Existing web analytics software generally fails to effectively answer these questions. Such software provides some statistics as to site visitation path flow, and provide reports showing visitation paths from node to node. However, such reports are often complex and extremely detailed, making it difficult for users to discern patterns among the displayed visitation paths. In some cases, it may be difficult to determine which paths point in which direction.

Another piece of information that is useful to website operators is a conversion rate for each page in a website. This conversion rate indicates a ratio between page visits and sales for each page in a website.

What is needed is a site analysis report that provides a visual, easy-to-understand representation of path flows from node to node.

What is further needed is a site analysis report that allows a user to dynamically specify how many node-to-node connections should be shown at any given time.

What is further needed is a site analysis report that provides a visual indication of conversion rate.

SUMMARY OF THE INVENTION

In the context of a site analysis report showing paths between nodes, color is used to indicate a direction of traffic that follows a particular node-to-node path. Different colors are assigned to different nodes in a site analysis report. Paths are color-coded according to their destination nodes, so as to provide a distinctive visual identification of a traffic flow direction. Node connection direction can be reinforced by static or moving arrows.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The Figures depict a preferred embodiment of the present invention for purposes of illustration only. One skilled in the art will readily recognize from the following discussion that alternative embodiments of the structures and methods illustrated herein may be employed without departing from the principles of the invention described herein.

DESCRIPTION OF EMBODIMENTS OF THE INVENTION

The present invention is a system and method for generating an improved site analysis report that might be displayed, for example, as part of a user interface for a web analytics tool. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms, displays, reports, and layouts presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Furthermore, the present invention is described below primarily in the context of web analytics data; however that is only by way of example, for convenience and ease of understanding of the concepts of the present invention. Those skilled in the art will recognize that the present invention is not limited to web analytics data but may also be used for any other type of data including but not limited to marketing data, sales data, application usage data, hardware usage data, financial data, health data, census data, etc.

Architecture

Figure 1:
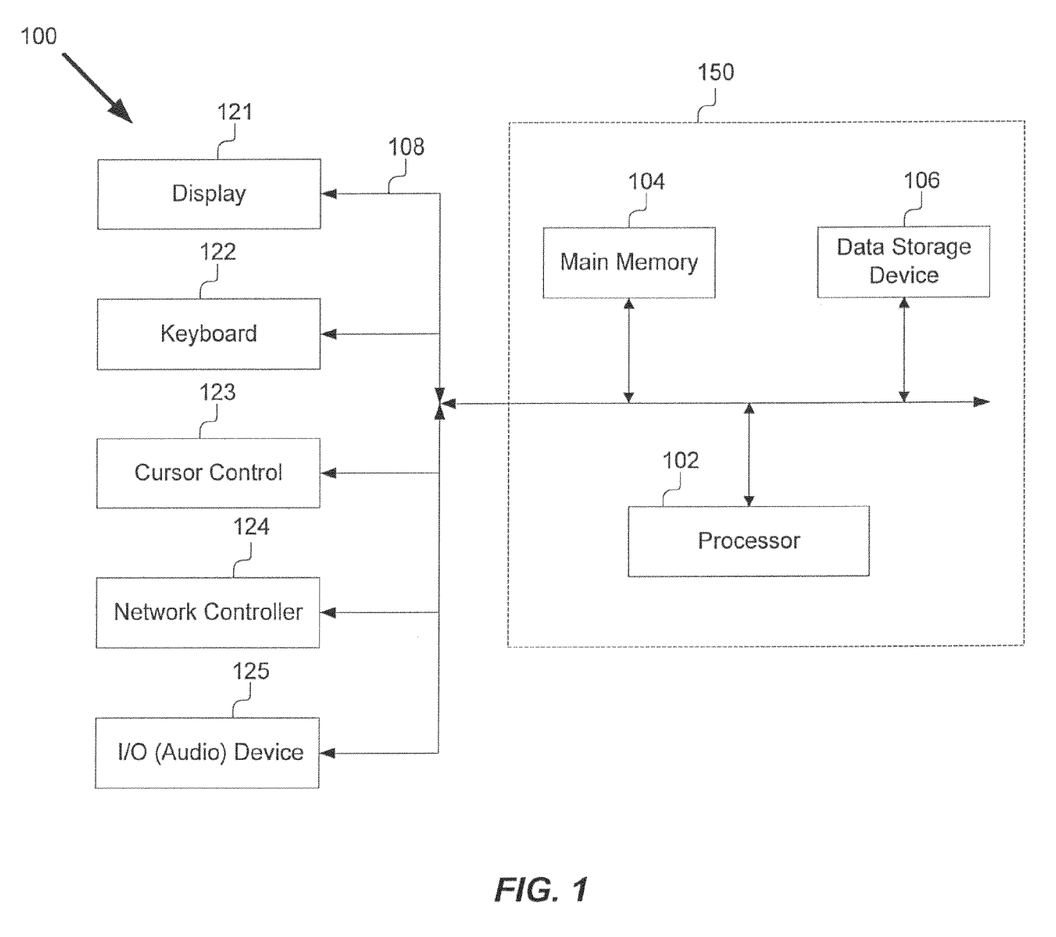
FIG. 1 is a block diagram of a system for presenting a web analytics report according to one embodiment of the present invention.

FIG. 1 is a block diagram of one embodiment of the system 100. While the present invention will now be described in the context of a von Neumann architecture, it should be understood that one embodiment of the present invention divides functionality in a client/server architecture. Referring to FIG. 1, the system 100 is shown as including a control unit 150, a display 121, a keyboard 122, a cursor controller 123, a network controller 124, and an input/output device 125. The control unit 150 is shown including a processor 102, main memory 104, and a data storage device 106, all of which are communicatively coupled to system bus 108.

Processor 102 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included.

Main memory 104 may store instructions and/or data that may be executed by processor 102. The instructions and/or data may comprise code for performing any and/or all of the techniques described herein. Main memory 104 may be a dynamic random access memory (DRAM) device, a static random access memory (SRAM) device, or some other memory device known in the art. The memory 104 is described in more detail below with reference to FIG. 2. In particular, the portions of the memory 104 for providing dynamic path flow display are shown in detail.

Data storage device 106 stores data and instructions for processor 102 and may comprise one or more devices including a hard disk drive, a floppy disk drive, a CD-ROM device, a DVD-ROM device, a DVD-RAM device, a DVD-RW device, a flash memory device, or some other mass storage device known in the art. More specifically for Web analytics a disk array or multiple servers and associated database may be used as the data storage device 106.

System bus 108 represents a shared bus for communicating information and data throughout control unit 150. System bus 108 may represent one or more buses including an industry standard architecture (ISA) bus, a peripheral component interconnect (PCI) bus, a universal serial bus (USB), or some other bus known in the art to provide similar functionality.

Additional components coupled to control unit 150 through system bus 108 include display device 121, keyboard 122, cursor control device 123, network controller 124 and I/O device 125. Display device 121 represents any device equipped to display electronic images and data as described herein. Display device 121 may be a cathode ray tube (CRT), liquid crystal display (LCD), or any other similarly equipped display device, screen, or monitor. Keyboard 122 represents an alphanumeric input device coupled to control unit 150 to communicate information and command selections to processor 102. Cursor control 123 represents a user input device equipped to communicate positional data as well as command selections to processor 102. Cursor control 123 may include a mouse, a trackball, a stylus, a pen, a touch screen, cursor direction keys, or other mechanisms to cause movement of a cursor. Network controller 124 links control unit 150 to a network that may include multiple processing systems. The network of processing systems may comprise a local area network (LAN), a wide area network (WAN) (e.g., the Internet), and/or any other interconnected data path across which multiple devices may communicate.

One or more I/O devices 125 are coupled to the system bus 108. For example, the I/O device 125 may be an audio device 125 equipped to receive audio input and transmit audio output. Audio input may be received through various devices including a microphone within audio device 125 and network controller 124. Similarly, audio output may originate from various devices including processor 102 and network controller 124. In one embodiment, audio device 125 is a general purpose audio add-in/expansion card designed for use within a general purpose computer system. Optionally, audio device 125 may contain one or more analog-to-digital or digital-to-analog converters, and/or one or more digital signal processors to facilitate audio processing.

It should be apparent to one skilled in the art that control unit 150 may include more or less components than those shown in FIG. 1 without departing from the spirit and scope of the present invention. For example, control unit 150 may include additional memory, such as, for example, a first or second level cache, or one or more application specific integrated circuits (ASICs). Similarly, additional components may be coupled to control unit 150 including, for example, image scanning devices, digital still or video cameras, or other devices that may or may not be equipped to capture and/or download electronic data to control unit 150.

Figure 2:
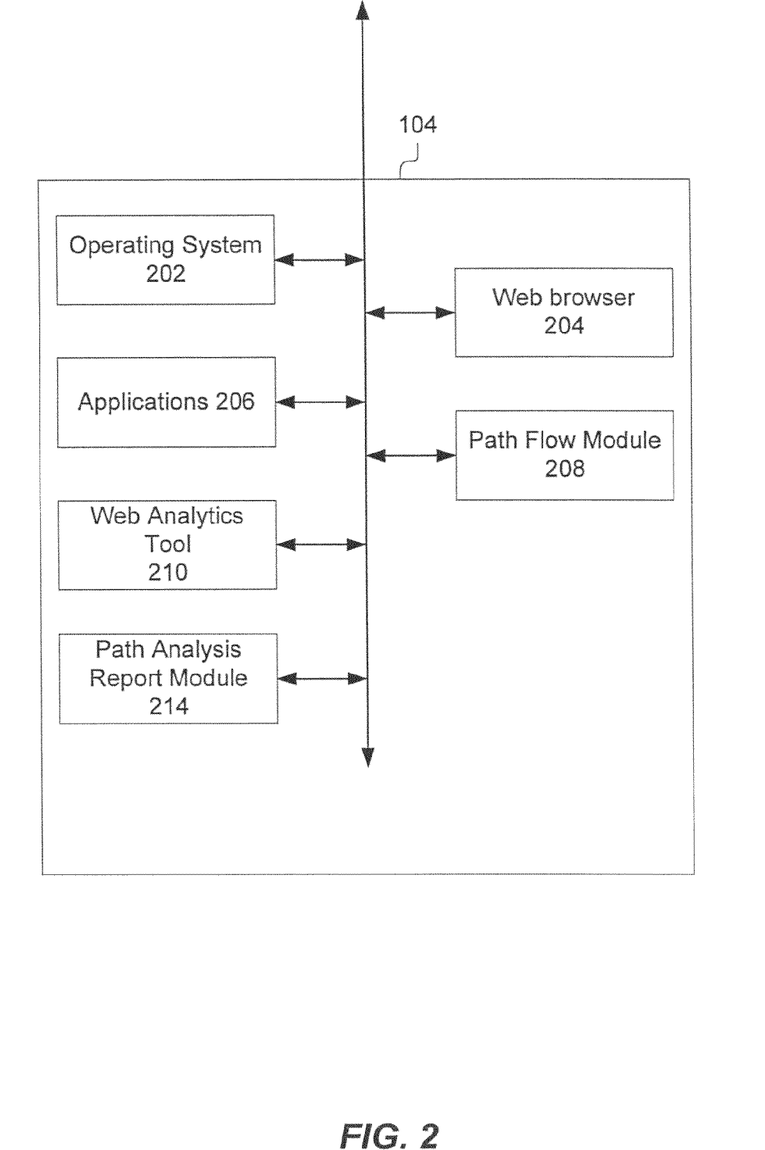
FIG. 2 is block diagram of a preferred embodiment of the memory of the system of FIG. 1.

FIG. 2 illustrates one embodiment of memory 104 of the present invention including operating system 202, a web browser 204, applications 206, a path flow module 208, a web analytics tool 210, and a path analysis report module 214.

The operating system 202 is preferably one of a conventional type such as WINDOWS®, SOLARIS® or LINUX® based operating systems.

The web browser 204 is of a conventional type that provides access to the Internet and processes HTML, XML or other mark up language to generated images on the display device 121. For example, the web browser 204 could be Mozilla Firefox or Microsoft Internet Explorer.

The memory unit 104 also includes one or more application programs 206 including, without limitation, word processing applications, electronic mail applications, spreadsheet applications, and web browser applications.

The memory 104 also includes a web analytics tool 210 such as Site Catalyst version 11 from Omniture of Orem, Utah.

The path flow module 208 is a program or routines for collecting and processing information as to visitation path flows for websites and web pages. In particular, the path flow module 208 determines which visitation paths tend to be followed and generates statistics describing such visitation paths. Demographic and geographic information regarding website visitors are monitored so that trends can be identified. The collected information is processed to generate statistics that can be displayed in a report, either in tabular form or in graphical form. In particular, in one embodiment of the present invention the path flow statistics are shown in a dynamic report via path analysis report module 214.

The path analysis report module 214 is a program or routines for generation of reports summarizing path flow data. The path analysis report module 214 is coupled to the web analytics tool 210 and the path flow module 208. The path analysis report module 214 receives data from each of these modules 208 and 210, and creates one or more reports for display of the combined information to the user. Examples of reports generated by the path analysis report module 214 are described in more detail below.

Figure 3:
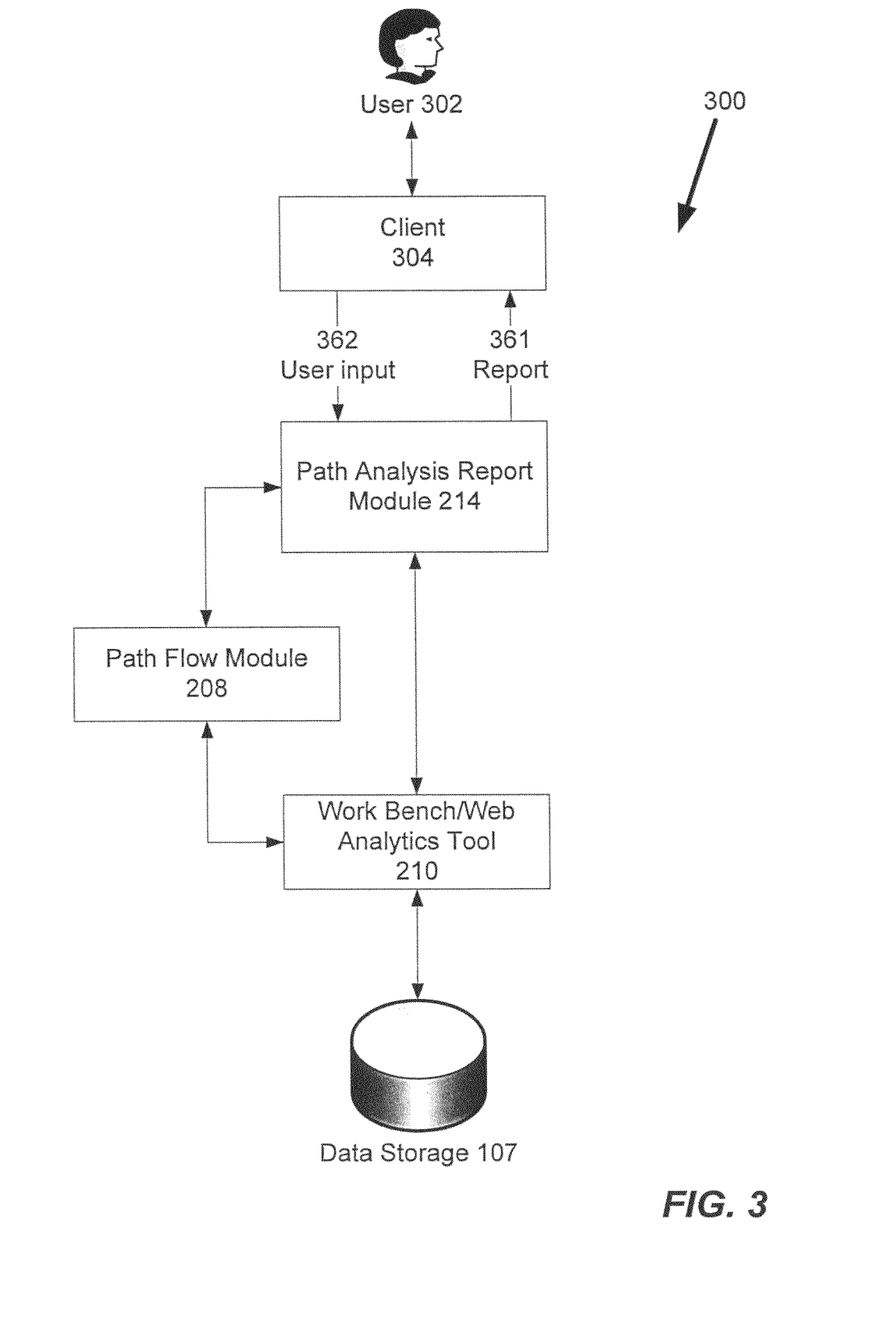
FIG. 3 is functional block diagram of the interaction of the system of the present invention with a user, a web analytics tool and a database.

Referring now to FIG. 3, a block diagram showing the interaction of the components of the present invention in a web analytics system 300 will be described. The path analysis report module 214 presents path flow reports 361 generated using data from the web analytics tool 210. The path analysis report module 214 also presents an interface that allows a user 302 to provide user input 362 that is sent to the path flow module 201. In this manner, user 302 can interact with path flow reports 361. The path analysis report module 214 is coupled for communication with the path flow module 201 and the web analytics tool 210.

The web analytics tool 210 is coupled to a data set or database in data storage 107. The data set can then be further manipulated by the web analytics tool 210 for the creation of reports, display to the user, tracking, targeting, and notification of users based on the data. Those skilled in the art will recognize that the functionality provided by the path analysis report module 214 may be integrated into the path flow module 201 and in such an embodiment the path flow module 201 would interact directly with the client 304.

Improvements to Site Analysis Reports

According to the present invention, several improvements are made to site analysis reports in order to improve clarity and readability. As will be recognized by one skilled in the art, these improvements can be implemented separately or in any combination. In one embodiment, path analysis report module 214 generates reports according to one or more of these techniques.

Use of Color to Indicate Direction of Traffic

Color is used to indicate a direction of traffic that follows a particular node-to-node path. Different colors are assigned to different nodes in a site analysis report. Paths are color-coded according to their destination nodes, so as to provide a distinctive visual identification of a traffic flow direction.

For example, a traffic path connecting a green node and a red node can be colored green or red depending on the direction of traffic. If the green node tends to be visited just before the red node (indicating a path from the green node to the red node), the green node is considered a source node and the red node is considered a destination node. Thus, the path connecting the nodes is colored red, which corresponds to the destination node. In one embodiment, the intensity of the color can be varied to indicate the volume of traffic along the path. In another embodiment, volume of traffic is indicated by thickness of the line or by other visual means.

Figure 4A:
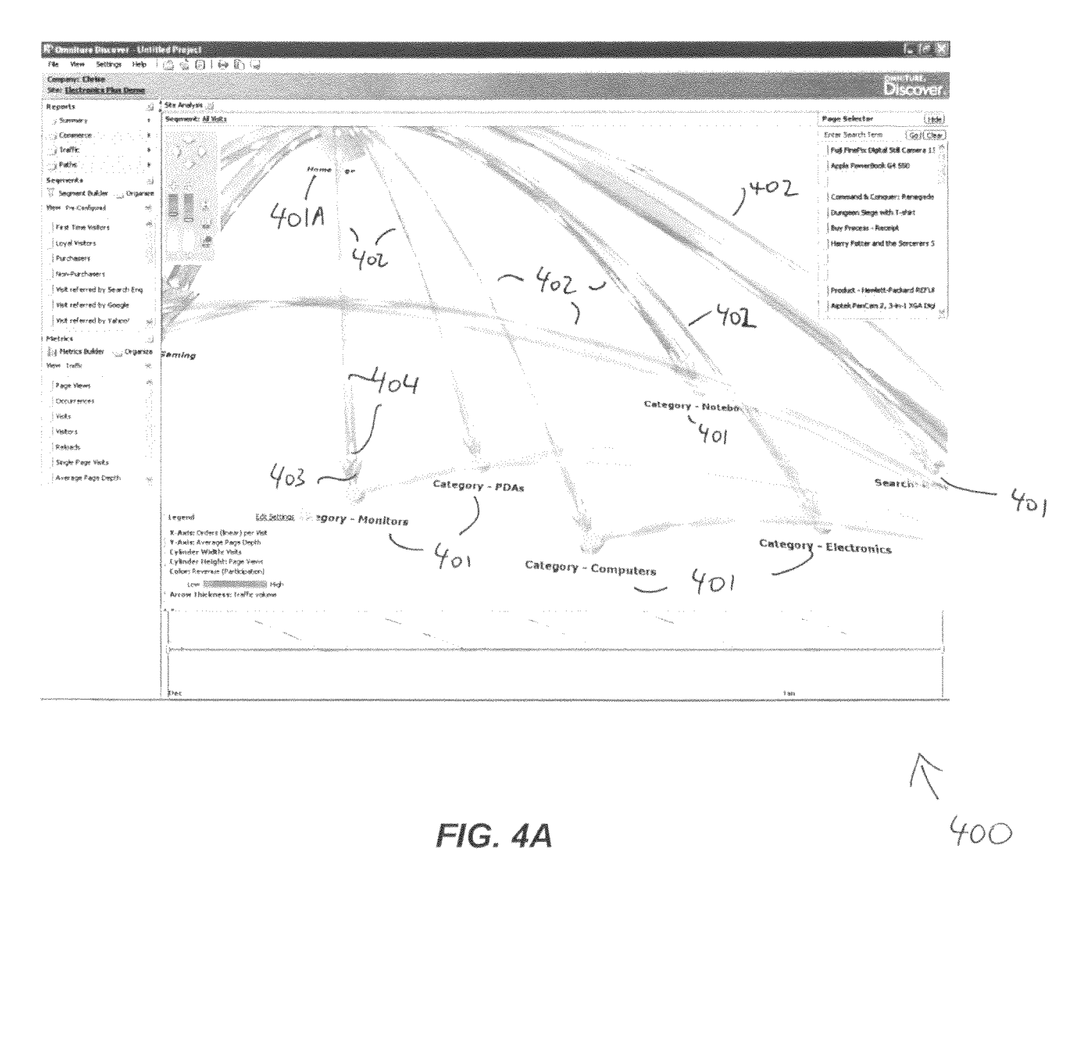
FIG. 4A is an example of the use of color to indicate direction of traffic in a site analysis report according to one embodiment.

Referring now to FIG. 4A, there is shown an example of a report 400 using colors to indicate directions of traffic according to one embodiment. Cylinders represent nodes 401, or web pages. In one embodiment, larger cylinders are more frequently visited than smaller cylinders; however, cylinder size can be indicative of any metric. Lines 402 between nodes 401 represent traffic moving from one node 401 to another (i.e., visiting one node 401 immediately after visiting another node 401). The color of each line 402 matches the color of the destination node 401, thus indicating a predominant direction of traffic for each node-to-node path. Thicker lines 402 indicate higher volumes of traffic from one node 401 to another. In this particular example, arrows 403, 404 are also used to further reinforce the direction of traffic.

Figure 4B:
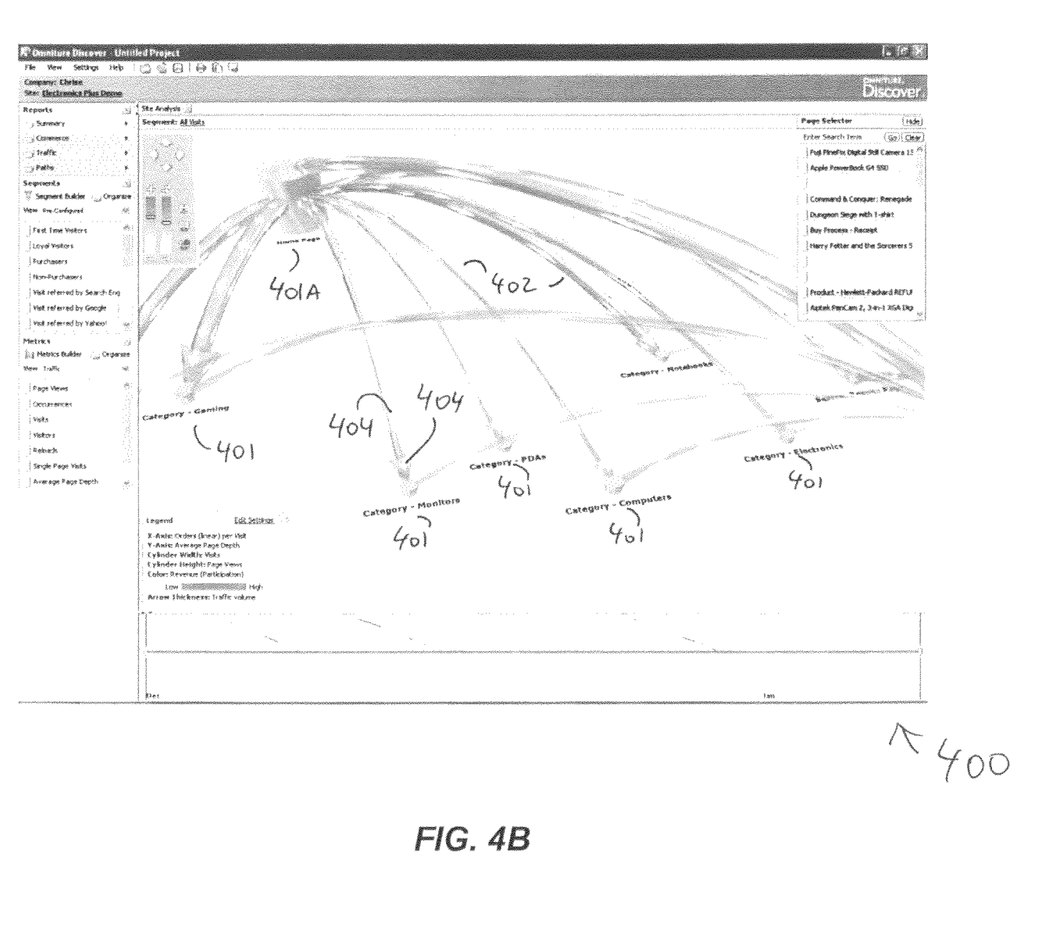
FIG. 4B is a second example of the use of color to indicate direction of traffic in a site analysis report according to one embodiment.

Referring now to FIG. 4B, there is shown another view of the same report 400, again using colors to indicate directions of traffic. This example shows green lines connecting home page 401A with other pages (nodes) 401 in the website, to indicate traffic flow from home page 401A to other pages 401. Red lines indicate traffic flow from pages 401 back to home page 401A.

In one embodiment, if traffic between two nodes 401 is bidirectional, two lines 402 are shown between the nodes 401, one in each color. In another embodiment, bidirectional traffic is indicated with a single line 402 that includes the colors of both nodes 401.

In one embodiment, animation is used to further indicate traffic direction, particularly in a context where a dynamic display is feasible, such as on a display screen. For example, moving arrows 404 can be included to show the direction of traffic; the arrows 404 can be presented in a color that matches that of the destination node 401, or they can change color from the source node 401 color to the destination node 401 color as they travel along the length of the path.

In another embodiment, the intensity of the line 402 color is non-uniform, becoming more intense closer to the destination node 401.

Figure 4C:
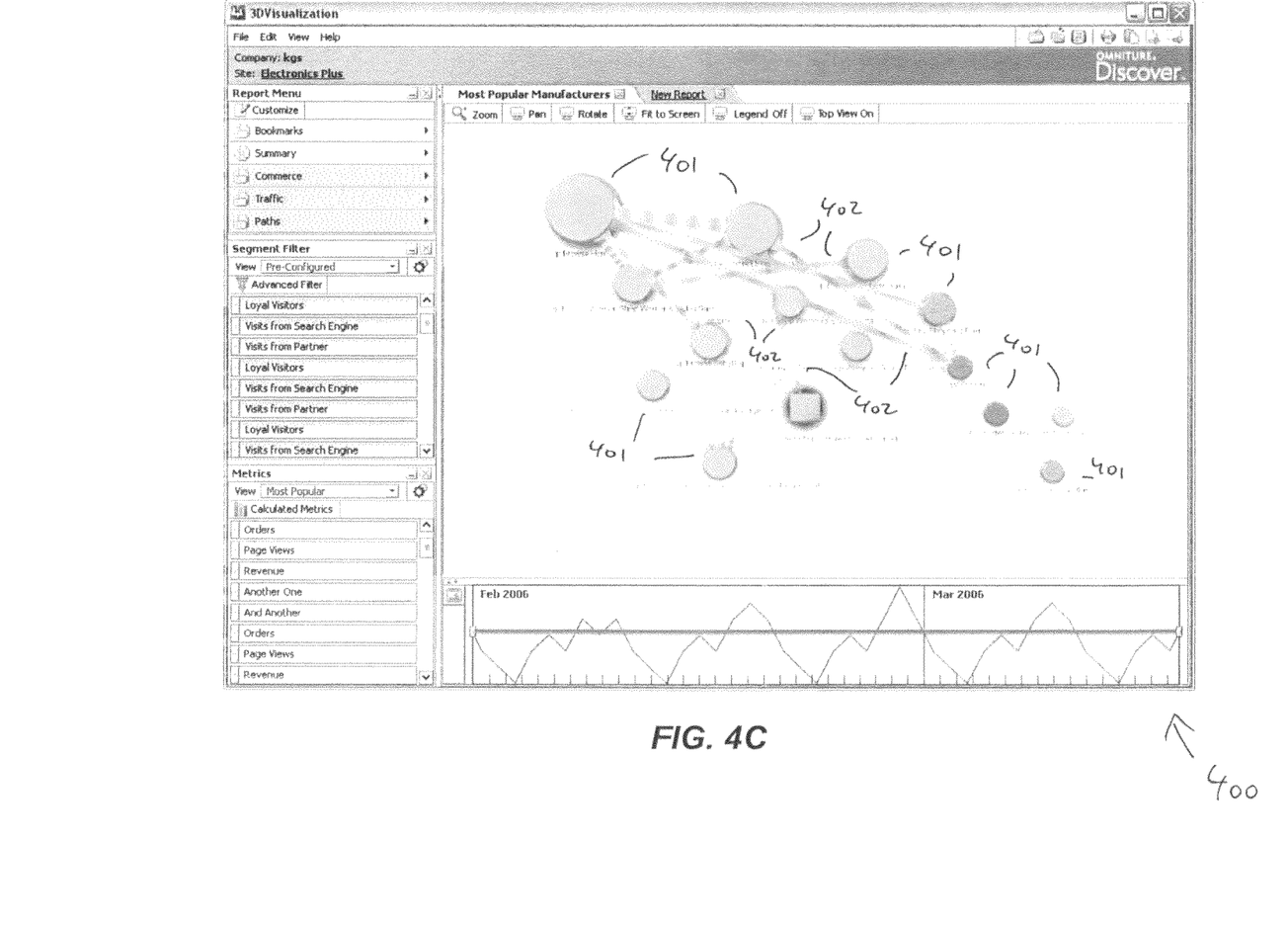
FIG. 4C is a second example of the use of color to indicate direction of traffic in a two-dimensional site analysis report according to one embodiment.

The examples are shown in three-dimensional versions with curved lines to heighten the illusion of depth. However, one skilled in the art will recognize that such reports can be shown in two-dimensional form, for example with straight lines instead of curved lines. An example of a report 400 presented in such a two-dimensional form is shown in FIG. 4C.

Relevance Slider

In some cases, reports may become cluttered because of the number of connections being shown. In one embodiment, the invention provides a mechanism by which a user can indicate that he or she is interested in seeing only a subset of connections. For example, a sliding control, or slider, can be included. The slider provides a continuous control for specifying any desired threshold degree of relevance. Depending on where the user places the control, only those connections that meet or exceed the specified threshold relevance are shown. Any measure of relevance can be used, such as for example the amount of traffic along a particular node-to-node connection, or the conversion rate for a destination node associated with a path, or any combination thereof. In one embodiment, relevance represents a combination of various metrics, such as a weighted combination of traffic and conversion metrics.

Figure 5A:
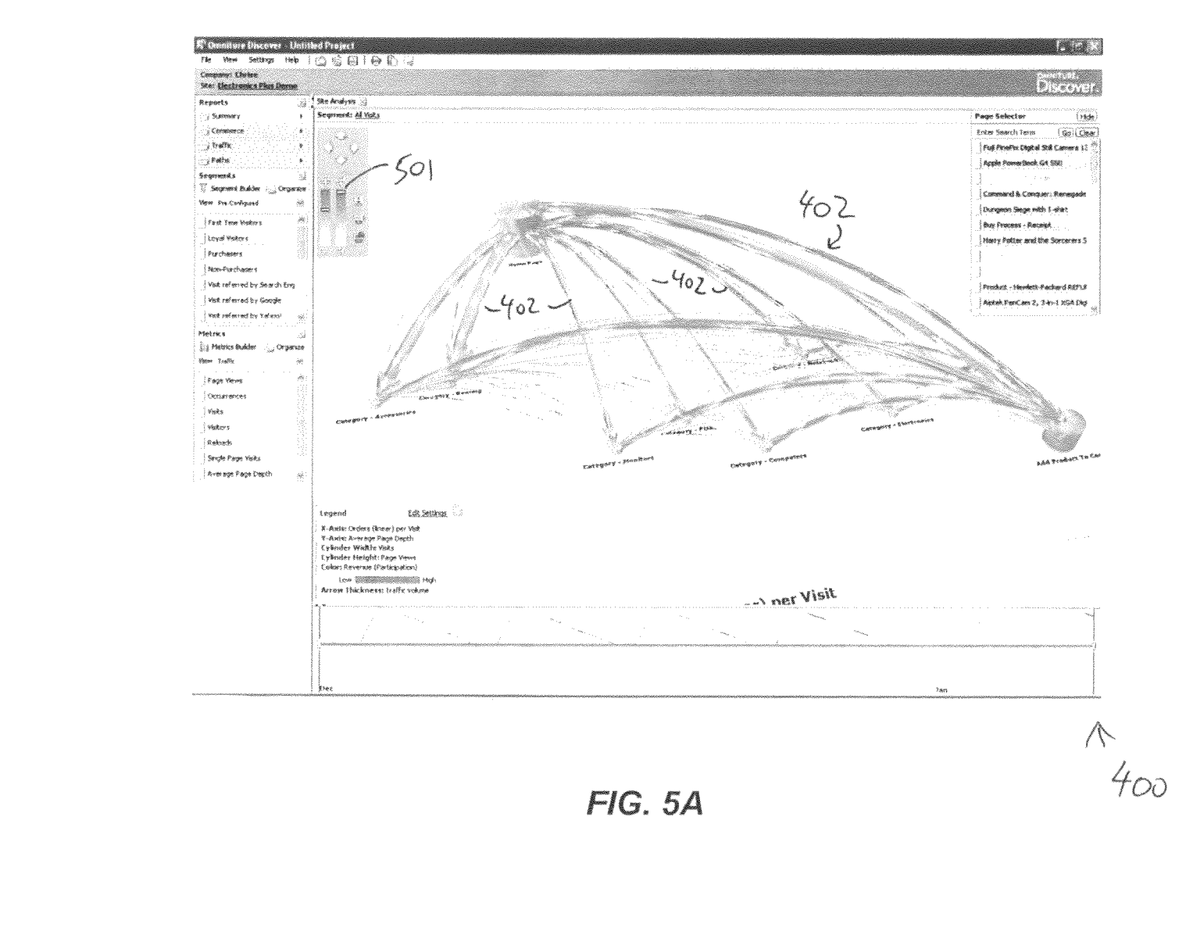
FIG. 5A is an example of a site analysis report including a relevance slider in a first position according to one embodiment.

For example, FIG. 5A is an example of report 400 similar to that shown in FIG. 4A. Relevance slider 501 is included; here, the user can move the relevance slider 501 to the topmost position. Thus, all node-to-node connections are shown in report 400. As can be seen from the example, report 400 tends to be quite cluttered when slider 501 is in this position.

Figure 5B:
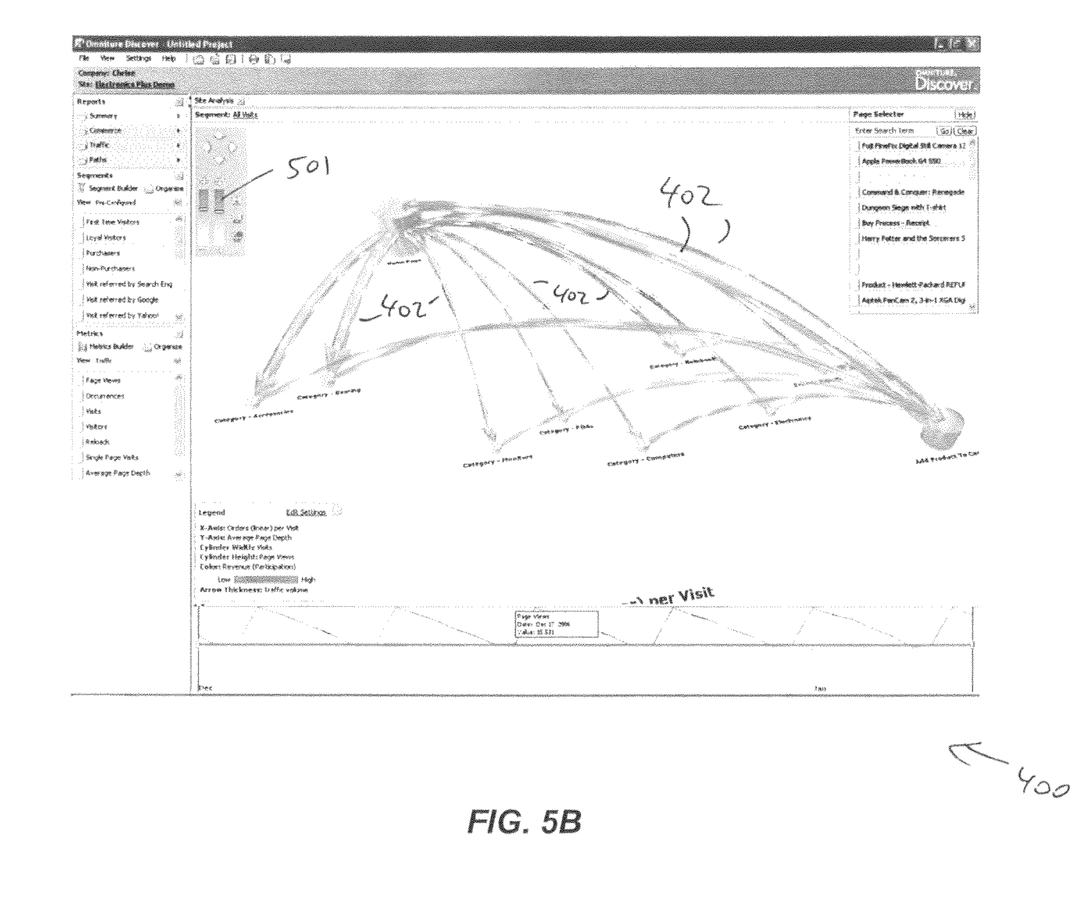
FIG. 5B is an example of a site analysis report including a relevance slider in a second position according to one embodiment.

FIG. 5B shows the same report 400 with relevance slider 501 in another position, about two-thirds of the way to the top. Here, the less-traveled node-to-node connections are not shown, so that the more heavily traveled connections can be more easily seen.

Figure 5C:
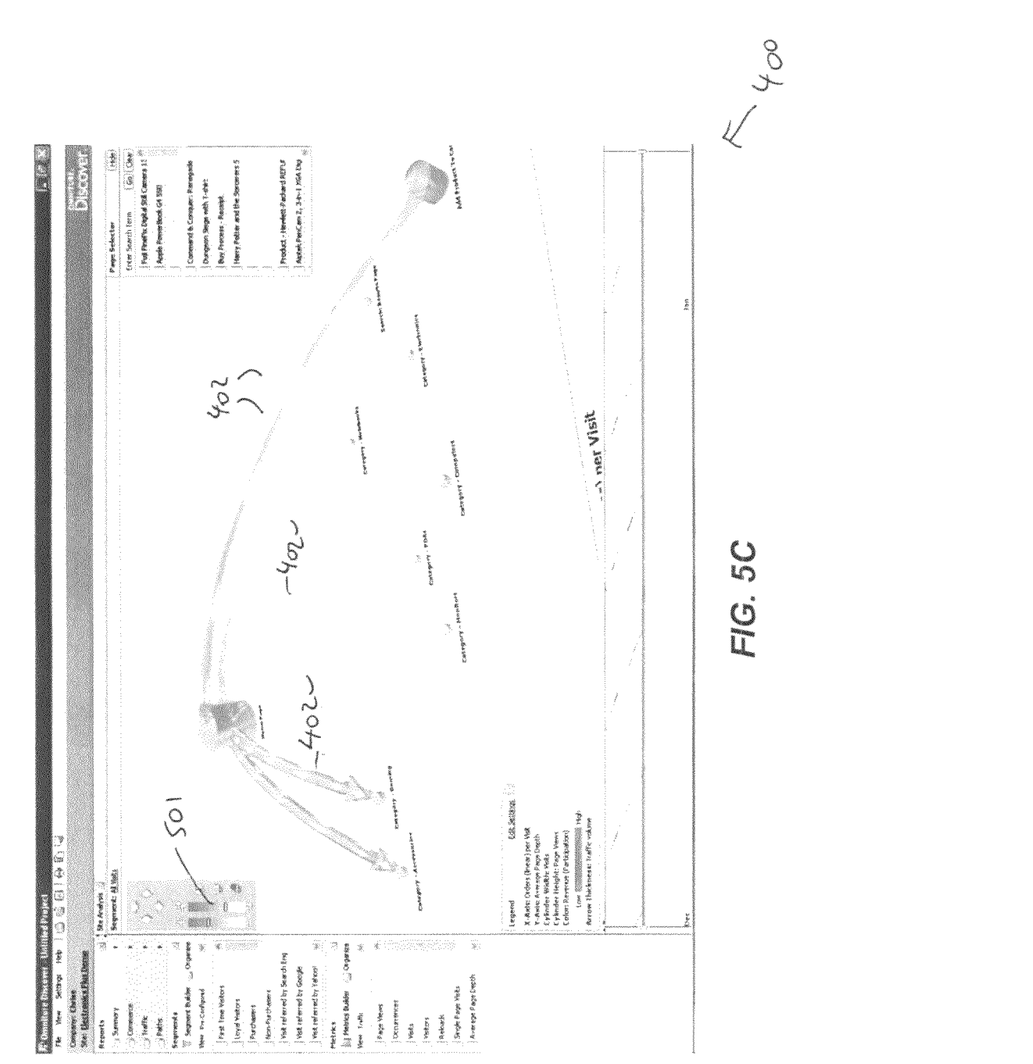
FIG. 5C is an example of a site analysis report including a relevance slider in a third position according to one embodiment.

FIG. 5C shows the same report 400 but with relevance slider 501 moved to a lower level, about one-third from the bottom. Here, even fewer node-to-node connections are shown, so that the more heavily traveled connections can be more easily seen.

Figure 5D:
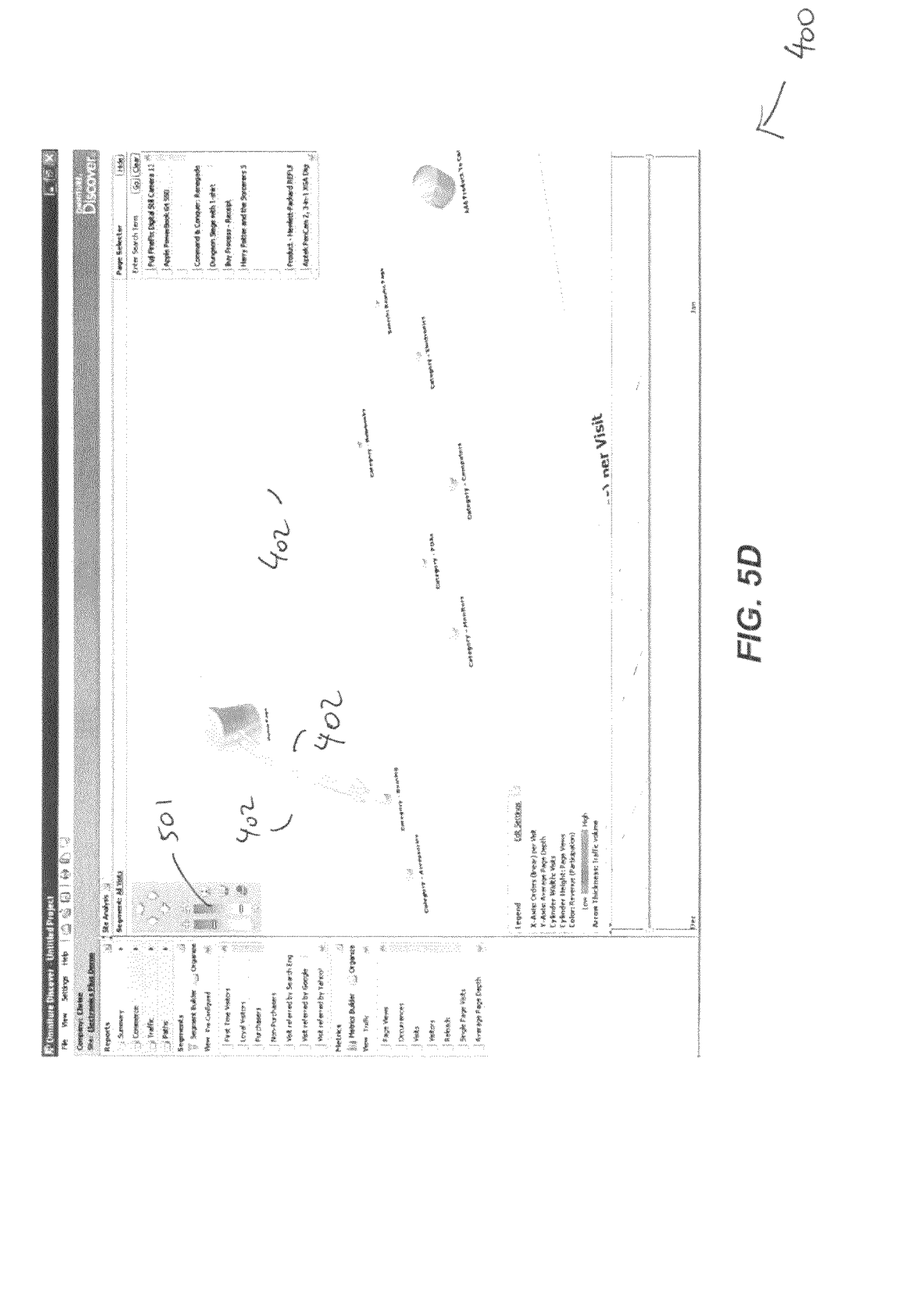
FIG. 5D is an example of a site analysis report including a relevance slider in a third position according to one embodiment.

FIG. 5D shows the same report 400 with relevance slider 501 moved to an even lower level, almost at the bottom. Here, the only three lines 402 are shown, representing the most heavily traveled connections. The fade effect shows the most heavily traveled connection with the darkest line.

In one embodiment, as the user moves relevance slider 501 up or down, lines 402 fade in and out, so as to reinforce the connection between slider 501 and its effect on report 400. Lines 402 for less-traveled connections fade more quickly than lines 402 for more heavily traveled connections. In one embodiment, the fade effect is implemented in a gradual manner, so that those lines 402 become fainter as slider 501 is moved down, as shown in FIGS. 5A-5D. Those lines 402 that are initially darkest (corresponding to the highest amounts of traffic) remain visible while other lines 402 fade away. The instantaneous fade-in and fade-out effect helps the user select a relevance level that is best suited for his or her immediate needs.

Intelligent Node Positioning

Site analysis reports are intended primarily to show information about node-to-node connections. As such, the actual position of each node within a report is of secondary importance, and in some prior art systems is arbitrary.

However, physical positioning of a node within a report can carry useful information. In one embodiment, the system of the present invention automatically positions nodes with the report according to a two-dimensional axis. Any desired meaning can be assigned to each axis. In one embodiment, the following default meanings are assigned:

The Y-axis indicates relative depth of a page in the site (how many previous pages users see, on average, before they see this page); and The X-axis represents conversion rate of a page, or ability of the page to turn a visit into a completed sale; this can be expressed as the number of orders per visit to the page In one embodiment, the automatic node positioning (as well as spacing and/or scale) is adjusted to allow for legibility and for proper spacing among nodes. Automatic node positioning can be turned off or overridden to allow a user to drag nodes around according to his or her wishes.

In one embodiment, node positioning is scaled so that the highest average page depth is assigned the highest number in the graph, and lower depths are displayed accordingly.

In one embodiment, other meanings can be assigned to the X and/or Y axes; for example, the person viewing the report may be able to indicate what each axis represents via a preferences screen.

An advantage of automatic intelligent node positioning is that it provides a visual indication of the site's architecture as well as of the ability of individual pages to convert visits into sales. For example, if a diagonal line is drawn from top left to bottom right, items below the line could be considered poor converters, while items above the line could be considered good converters.

Figure 6A:
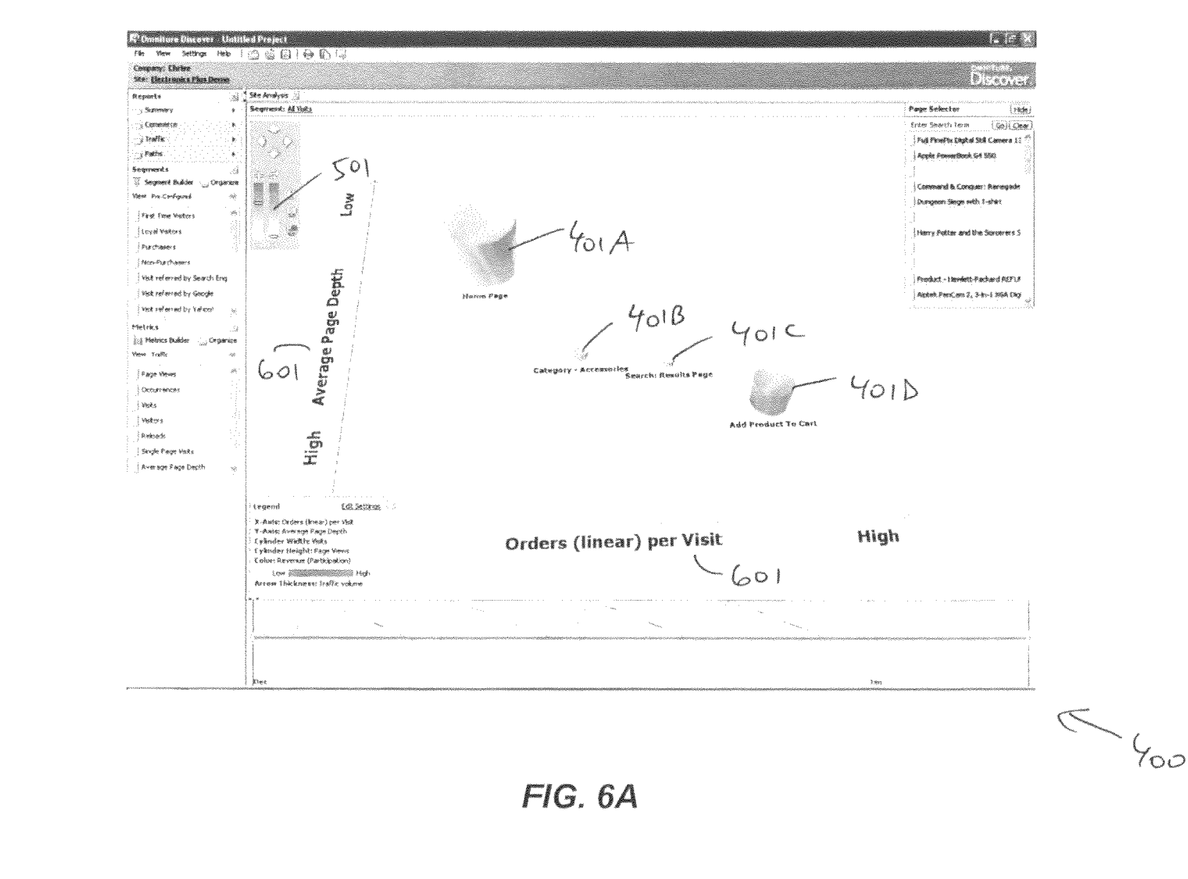
FIG. 6A is an example depicting intelligent node positioning in a site analysis report according to one embodiment.

FIG. 6A depicts an example of a report 400 where nodes 401 have been automatically positioned according to average page depth (Y-axis) and orders per visit (X-axis). For illustrative purposes, no node connections are shown (relevance slider 501 has been moved to its lowest position), and the axes 600 are labeled.

Home page 401A is in the upper left corner, indicating that it is of a low page depth (usually visited fairly early in the course of a site visit), and of a low Orders per page view (fewer people than average purchase after seeing that page). Category Accessories page 401B and the Search Results page 401C have roughly equal page depth to one another, and are deeper in the site than home page 401A. Search Results page 401C has a higher than average conversion rate than does Category Accessories page 401B. Add product to cart page 401D is deeper in the site than other pages, and also has a higher conversion rate.

Figure 6B:
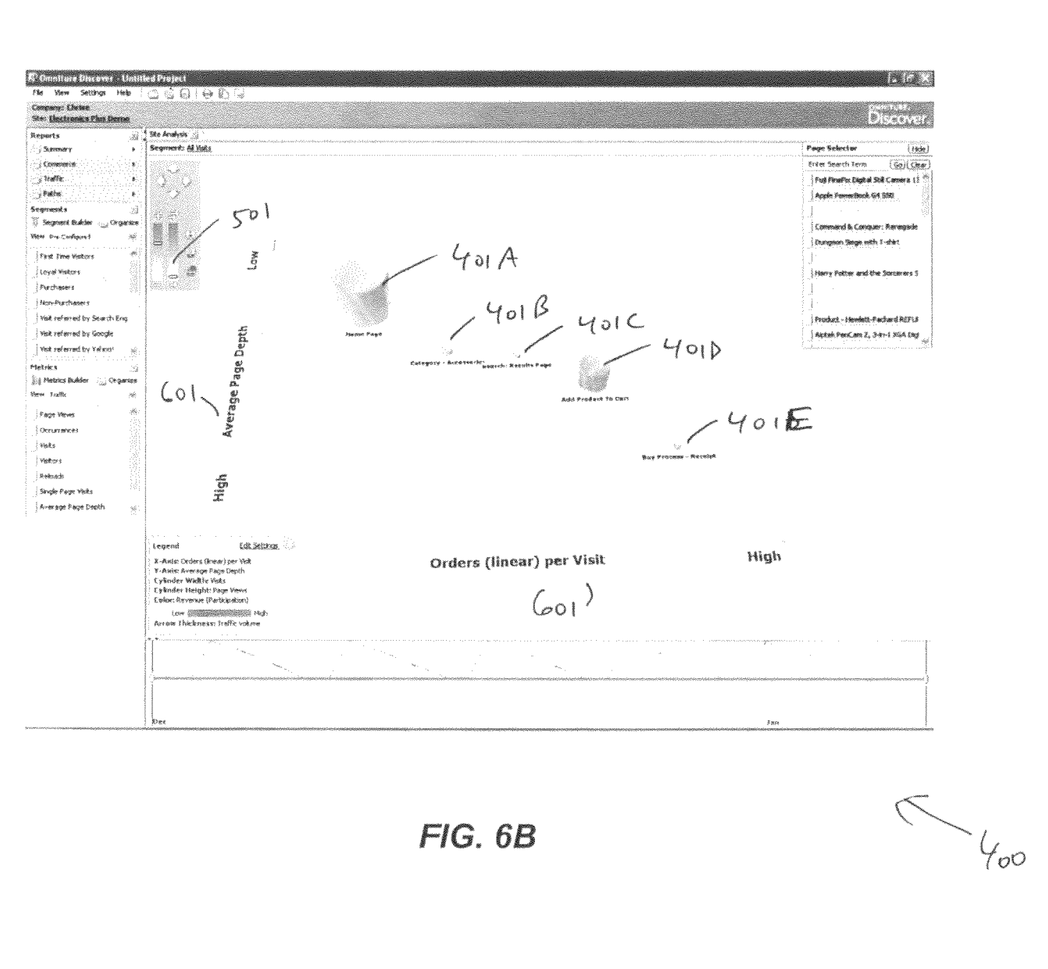
FIG. 6B is a second example depicting intelligent node positioning in a site analysis report according to one embodiment.

Referring now to FIG. 6B, there is shown report 400 with another page added: Buy Process—Receipt page 401E. Page 401E is deeper in the site than any other page depicted in report 400, and also has a higher conversion rate.

Combination

Figure 7:
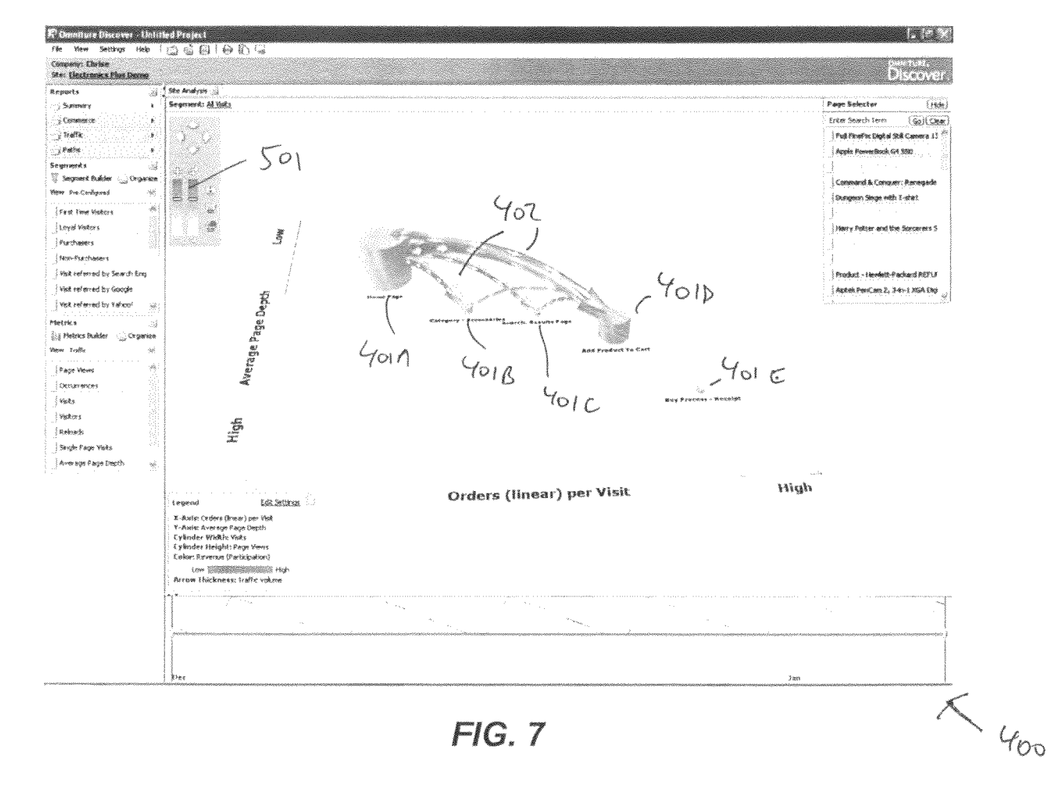
FIG. 7 is an example depicting intelligent node positioning, relevance slider, and use of color in a site analysis report according to one embodiment.

Referring now to FIG. 7, there is shown report 400 illustrating relevance slider 501, intelligent node position, and use of color according to one embodiment combining these three concepts. Since relevance slider 501 has been moved up from its lowest position, lines 402 are now visible showing connections among nodes.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct a more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. A method for outputting a site analysis report, comprising:
    obtaining visitation data for a first node and a second node;
    outputting a representation of the first node in a first color;
    outputting a representation of the second node in a second color; and
    outputting a line connecting the first and second nodes, the line having a color selected from the first and second colors, the selected color indicating a direction of traffic between the first node and the second node, and the line having a color intensity that varies according to proximity to at least one of the first node and the second node.

2. The method of claim 1, wherein outputting the line comprises outputting a line including a visual indication of the amount of traffic between the first node and the second node.

3. The method of claim 1, wherein outputting the line comprises outputting a line having a color intensity indicating an amount of traffic between the first node and the second node.

4. The method of claim 1, wherein outputting the line comprises outputting a line having a thickness indicating an amount of traffic between the first node and the second node.

5. The method of claim 1, wherein outputting the line comprises outputting a line having an arrow indicating the direction of traffic between the first node and the second node.

6. The method of claim 1, wherein outputting the line comprises outputting an animated line indicating the direction of traffic between the first node and the second node.

7. The method of claim 1, wherein outputting the representations of the nodes and the line comprise displaying the nodes and the line on a display screen.

8. The method of claim 1, wherein outputting the representations of the nodes and the line comprise printing the nodes and the line on a printed report.

9. A computer program product for outputting a site analysis report, comprising:
    a non-transitory computer-readable medium; and
    computer program code, encoded on the medium, for:
        obtaining visitation data for a first node and a second node;
        outputting a representation of the first node in a first color;
        outputting a representation of the second node in a second color; and
        outputting a line connecting the first and second nodes, the line having a color selected from the first and second colors, the selected color indicating a direction of traffic between the first node and the second node, and the line having a color intensity that varies according to proximity to at least one of the first node and the second node.

10. The computer program product of claim 9, wherein the computer program code for outputting the line comprises computer program code for outputting a line including a visual indication of the amount of traffic between the first node and the second node.

11. The computer program product of claim 9, wherein the computer program code for outputting the line comprises computer program code for outputting a line having a color intensity indicating an amount of traffic between the first node and the second node.

12. The computer program product of claim 9, wherein the computer program code for outputting the line comprises computer program code for outputting a line having a thickness indicating an amount of traffic between the first node and the second node.

13. The computer program product of claim 9, wherein the computer program code for outputting the line comprises computer program code for outputting a line having an arrow indicating the direction of traffic between the first node and the second node.

14. The computer program product of claim 9, wherein the computer program code for outputting the line comprises computer program code for outputting an animated line indicating the direction of traffic between the first node and the second node.

15. The computer program product of claim 9, wherein the computer program code for outputting the representations of the nodes and the line comprises computer program code for displaying the nodes and the line on a display screen.

16. The computer program product of claim 9, wherein the computer program code for outputting the representations of the nodes and the line comprises computer program code for printing the nodes and the line on a printed report.

17. A computer-implemented system for outputting a site analysis report, comprising:
- a processor, for processing electronic signals representing data and for executing instructions stored in a memory device;
- a memory device, for storing instructions to be performed by the processor;
- a path flow module, implemented as instructions stored in the memory device for causing the processor to obtain visitation data for a first node and a second node;
- a path analysis report module, implemented as instructions stored in the memory device for causing the processor to transform the obtained visitation data to generate site analysis report comprising:
  - a representation of the first node in a first color;
  - a representation of the second node in a second color; and
  - a line connecting the first and second nodes, the line having a color selected from the first and second colors, the selected color indicating a direction of traffic between the first node and the second node, and the line having a color intensity that varies according to proximity to at least one of the first node and the second node; and
- an output device, coupled to the path analysis report module processor for outputting the generated site analysis report.

18. The system of claim 17, wherein the line in the site analysis report includes a visual indication of the amount of traffic between the first node and the second node.

19. The system of claim 17, wherein the line in the site analysis report includes an arrow indicating the direction of traffic between the first node and the second node.

20. The system of claim 17, wherein the output device comprises a display screen.

21. The system of claim 17, wherein the output device comprises a printer.

* * * * *